Oct. 7, 1969  S. M. LOVELESS  3,470,910
HIGH PRESSURE VALVE WITH LOW-PRESSURE OPERATING DEVICE
Filed March 3, 1967

INVENTOR.
STANLEY M. LOVELESS
BY
Woodhams, Blanchard & Flynn
ATTORNEYS

United States Patent Office 3,470,910
Patented Oct. 7, 1969

3,470,910
HIGH-PRESSURE VALVE WITH LOW-PRESSURE OPERATING DEVICE
Stanley M. Loveless, Oshtemo Township, Kalamazoo County, Mich., assignor to General Gas Light Company, Kalamazoo, Mich., a corporation of Michigan
Filed Mar. 3, 1967, Ser. No. 620,296
Int. Cl. F16k *31/385*
U.S. Cl. 137—625.6     6 Claims

ABSTRACT OF THE DISCLOSURE

A high-pressure valve assembly having an inlet port, a vent port, and a load port, the inlet port normally being connected to a source of high-pressure fluid. The valve assembly includes an axially shiftable valve member which is normally maintained in a closed position in which the inlet port and the vent port are interconnected to each other by means of a small orifice therebetween. The valve is actuated by means of a low pilot pressure which activates a plunger member to seal or close off the orifice between the inlet and the vent port, high-pressure fluid from the pressure source thus causing the valve member to shift axially whereby the load port is interconnected to the inlet port so as to transmit high-pressure fluid to the load. Release of the low pilot pressure permits the orifice to open and the valve member to return to its closed position.

FIELD OF THE INVENTION

The field of art to which the present invention pertains involves multiway valve units for fluid handling, said valve units including a plurality of external ports and specifically including an inlet port and one or more outlet ports and the valve unit being operated by means of a fluid motor so as to permit the inlet port to be selectively coupled to the outlet port.

DESCRIPTION OF THE PRIOR ART

Valve assemblies having axially shiftable valve members so as to permit the supply or inlet port to be selectively connected to an outlet port are well known in the prior art. However, most of the prior art assemblies required the application of a rather large force in order to shift the valve axially from one position to another position since the force had to be large enough not only to accomplish the shifting of the valve member but it also had to be large enough to overcome the force exerted on the valve due to the pressure of the fluid acting upon the valve from the inlet port. Thus, in situations where the supply or inlet pressure was of a rather high magnitude, a rather substantial external force had to be applied to the valve member in order to shift the same axially from one position to the other. The requirement of such a high force for shifting the valve member axially from one position to another had the disadvantage that it necessitated a rather large and complex power source in order to accomplish the shifting action. Further, the use of such a large force necessarily required that the over-all valve structure and the individual components thereof be of rather large size in order to withstand the large forces and stresses imposed upon the valve assembly, thus making miniaturization of the valve assembly, or its use with fluidic circuits, essentially impossible.

In many situations, it is highly desirable to utilize a fluid pressure motor to actuate the shiftable valve member since use of a fluid pressure motor permits the valve to be efficiently and quickly shifted by remote control means. However, since most of the prior art valve assemblies required the use of relatively large external forces in order to effectively shift the valve member from one position to another, the use of fluid pressure motors was not always feasible due to the fact that the large forces necessarily required that the fluid pressure motor utilize a relatively high-pressure fluid which may not be conveniently available and which may result in a considerable sealing problem.

Furthermore, in many situations it is desired to shift the valve assembly from one position to another in response to relatively minor changes in environmental temperature or pressure. However, since the changes in the environmental temperature or pressure are of relatively small magnitude, it was generally necessary to install auxiliary power equipment of a rather complicated nature which would be responsive to the minor changes in environmental temperature or pressure, and which equipment would have the capacity of developing the relatively large external forces necessary to accomplish the shifting of the valve member.

SUMMARY OF THE INVENTION

A principal object of the invention is to provide a high-pressure valve assembly which overcomes the disadvantages of the prior art as set forth above, and which has the further advantages as specifically set forth below:

(1) To provide a high-pressure valve assembly capable of transmitting high-pressure fluid from an inlet port to one or more outlet ports, the valve being selectively shiftable by means of a fluid motor actuator utilizing a low pilot pressure.

(2) To provide a valve assembly, as aforesaid, in which the valve is normally maintained in a first position wherein the inlet port is interconnected with a vent port, the passageway interconnecting said ports including a small orifice which is normally open so as to permit the fluid from the inlet port to flow therethrough.

(3) To provide a valve assembly, as aforesaid, in which the fluid motor actuator includes a plunger member which is extendable into the orifice so as to close the same whenever the fluid motor is actuated by the pilot pressure.

(4) To provide a valve assembly, as aforesaid, in which the plunger assembly is provided with a small projection which extends into the orifice to close the same, the pilot pressure for actuating the plunger assembly being of a relatively small magnitude when compared to the magnitude of the pressure supplied to the valve through the inlet port.

(5) To provide a valve assembly, as aforesaid, further including a chamber located intermediate said orifice and said inlet port, whereby said high-pressure fluid develops a high pressure within said chamber whenever said orifice is closed whereby said valve member is caused to shift from said first position to a second position.

(6) To provide a valve assembly, as aforesaid, in which the fluid motor actuator can be made responsive to rather small changes in environmental temperature or pressure so as to actuate the plunger assembly whereby the orifice is closed, causing the valve member to be shifted from a first to a second position.

(7) To provide a valve assembly, as aforesaid, which can be operated by only a very small input force, thereby rendering actuation of the valve assembly, either manually or mechanically, extremely easy.

(8) To provide a valve assembly, as aforesaid, which is of sufficient structural simplicity that it will operate under severe conditions for long periods of time and with only minimum maintenance.

Other objects and purposes of the invention will be apparent to persons acquainted with the apparatus of this general type upon reading the following specification and inspecting the accompanying drawings.

GENERAL DESCRIPTION

In general, the valve structure consists of a valve rod having a pressure receiving means, flexible diaphragms in one illustrated embodiment, mounted thereon near each end and having a pair of spaced valve elements supported on said rod between said pressure receiving means. A housing surrounds said rod and defines first and second spaced chambers receiving said pressure receiving means, each thereof being positioned to divide each of said chambers into two compartments. Said chambers are connected by a passageway through which said rod extends. Seats for said valves are provided at each end of said passageway. A first port, preferably an inlet port, extends into said first chamber on one side of the pressure receiving means therein while a second port, preferably a load port, extends from the exterior of the valve into said central passageway. In a three-way valve, a third port, usually an exhaust port, communicates with the second chamber on one side of the pressure receiving means therein. The valve rod is normally biased into a first position whereby said load port is sealed off from said inlet port.

The valve rod is provided with an opening therein which is in communication with the first chamber. The opening in the valve rod is in communication with the second chamber by means of a first orifice formed within the end of the valve rod whereby the pressurized fluid entering the first chamber by means of the inlet port passes through the opening and through the first orifice into the second chamber. The valve assembly is further provided with a third chamber which is interconnected to the second chamber by means of a second orifice, the second orifice being of a larger diameter than the first orifice whereby the pressurized fluid passing through the first orifice into the second chamber is then transferred through the second orifice into the third chamber, which chamber is provided with a vent port so as to permit the fluid to be vented to the atmosphere or to other lower pressure environment. The second orifice is always of a larger diameter than the first orifice so as to prevent the development of a high pressure within the second chamber.

The third chamber is also divided into first and second compartments by means of a flexible diaphragm which has a plunger assembly rigidly attached thereto. The first compartment of the third chamber is in communication with a pilot pressure source of relatively low pressure. Energization of the pilot pressure source causes low-pressure fluid to be transferred into the first compartment of the third chamber whereby the diaphragm is caused to flex which in turn causes the plunger member to extend into and seal off the second orifice, thus preventing the pressure fluid within the second compartment from escaping into the second compartment of the third chamber whereby it is normally exhausted to the atmosphere. Closure of the second orifice thus causes the pressure fluid to accumulate within the second chamber, causing a high pressure to develop therein. The high pressure developed within the second compartment bears against the diaphragm and, due to the pressure differential on opposite sides thereof, causes the diaphragm and the associated valve rod to shift axially whereby the valve element within the first compartment is opened so as to interconnect the inlet port with the load port.

DETAILED DESCRIPTION

Figure 1:
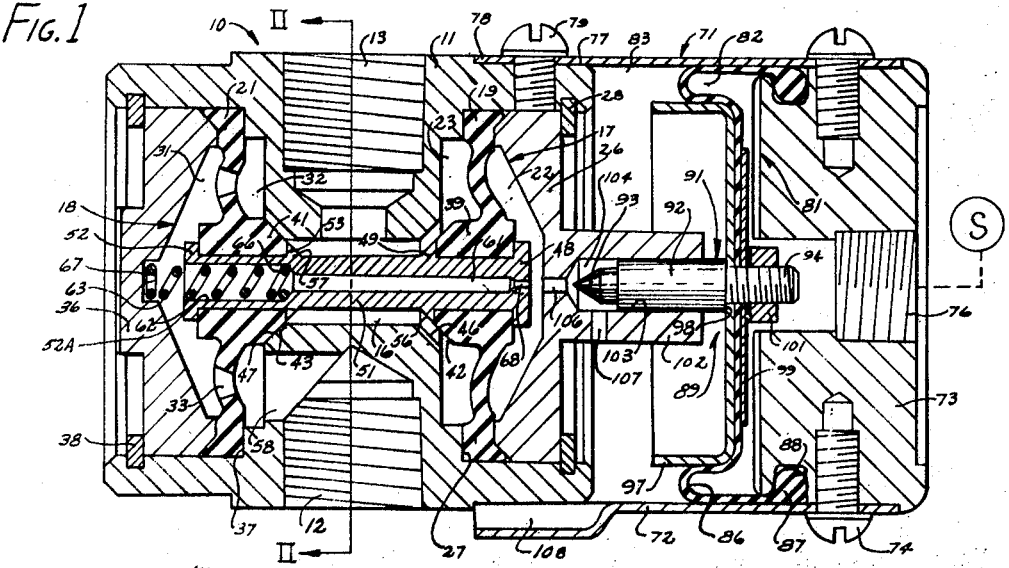
FIGURE 1 is a cross-sectional view of a preferred embodiment of the valve assembly of the present invention.
Figure 2:
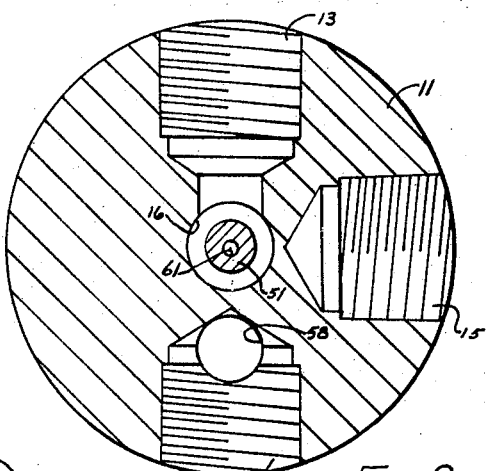
FIGURE 2 is a cross-sectional view taken along the line II—II of FIGURE 1.

Referring first to FIGURES 1 and 2, there is shown generally at 10 a valve assembly substantially similar to the valve assembly shown in U.S. Patent No. 2,912,009. However, for purposes of convenience, a brief description of said valve assembly will be set forth herewith, together with a full indication of the modifications necessary to embody the present invention.

A valve housing 11 is provided with external ports 12, 13 and 15, the external port 12 being generally referred to as an inlet port since a pressure-supply conduit is generally connected thereto, the external port 13 being generally referred to as a load port since a fluid working conduit is generally connected thereto and the port 15 being generally referred to as an exhaust port since same is usually connected to the low-pressure side, e.g., atmosphere, of the pressure fluid circuit. It will be understood that where an exhaust function is not required, the exhaust port 15 can be omitted or it can be plugged. Thus, the valve can be connected for two-way or three-way operation.

Assuming, for purposes of example, that the valve is being used to supply compressed air or other pressure fluid to a pressure cylinder, the term "supply conduit" will refer to the conduit supplying the high pressure from the source to the valve. Similarly, the term "working conduit" will refer to the conduit connecting the conduit to the supply side of a load such as a pressure-fluid cylinder being controlled by the valve. Similarly, the term "exhaust" refers to a port connecting the interior of the valve to the low-pressure side of the system.

A central passageway 16 is provided within the valve housing to which the load port 13 is directly connected. A pair of end chambers 17 and 18 are provided at each end of the central passageway 16 and in said chambers are located the diaphragms 19 and 21, respectively.

The diaphragm 19 is imperforate and divides the end chamber 17 into two nonconnecting compartments 22 and 23. An end member 26, hereinafter described in further detail, closes the axially outer end of the end chamber 17 and provides the outer wall of the compartment 22. Said end member 26 holds the diaphragm 19 firmly in place against a shoulder 27 formed within the valve housing 11, the end member 26 in turn being held firmly in place by any convenient means, such as a snap ring 28.

A perforate diaphragm 21 divides the end chamber 18 into two compartments 31 and 32 which communicate with each other through the openings 33 formed in a diaphragm 21. An end member 36 closes the axially outer end of the end chamber 18 and defines the axially outer wall of the compartment 31. The end member 36 holds the diaphragm 21 firmly in place against a shoulder 37 formed within the valve housing, the end member being held firmly in place by any convenient means, such as a snap ring 38.

The diaphragms 19 and 21 are provided with hubs 39 and 41, respectively, said hubs being provided with respective valve surfaces 42 and 43. The valve surfaces 42 and 43 bear against the respective valve seats 46 and 47 formed within the valve housing 11 when said hubs are moved axially in an appropriate manner. Communication between the central passageway 16 and the compartment 23 of the end chamber 17 is controlled by the position of the valve surface 42 with respect to the valve seat 46, and communication between the central passageway 16 and the compartment 32 of the end chamber 18 is controlled by the position of the valve surface 43 with respect to the valve seat 47. Compartment 32 of the end chamber 18 also communicates with the inlet port 12 by means of a passageway 58 therebetween. Compartment 23 of end chamber 17 communicates with exhaust port 15 by means of a passageway (not shown) which is similar to passageway 58 and is displaced 90° therefrom.

A central rod 51 (FIGURE 1) is positioned, preferably coaxially, within the central passageway 16 and functions in part to connect and coordinate the movements of the diaphragm 19 and 21. Flanges 48 and 49 on the rightward (as appearing in FIGURE 1) part of said rod receive the hub 39 of the diaphragm 19 and hold said diaphragm against axial movement with respect to said rod. Flanges 52 and 53 on the leftward end of said rod receive the hub 41 of the diaphragm 21 and hold said diaphragm against axial movement with respect to said rod. The mutarily facing surfaces of the flanges 49 and 53 are bevelled to provide substantially continuous extensions of the valve surfaces 42 and 43, respectively, as shown in FIGURE 1.

Thus far, the structure described is essentially that shown in U.S. Patent No. 2,912,009, and forms no independent portion of the present invention but has been set forth primarily for the purpose of convenience and reference. Attention is now directed to the valve actuator, or head, assembly 71 and its interrelationship with the central rod 51, which interrelationship comprises the present invention. As shown in FIGURE 1, the central rod 51 is provided with an opening 61 preferably extending coaxially therethrough. The opening 61 formed within the end of the rod which extends into the chamber 18 is enlarged at 62 so as to slideably receive a compression spring 63 therein. One end of the compression spring 63 bears against a shoulder 66 formed within the rod 51 while the other end of the compression spring is received within a recess 67 formed within the end member 36. The compression spring 63 thus biases the rod 51 and the diaphragms 19 and 21 rightwardly (as appearing in FIGURE 1) so as to cause the valve surface 43 to be in sealing engagement with the valve seat 47. In this position, the load port 13 is thus sealed off from the compartment 18 and the inlet port 12. The other end of the opening 61 located within the end of the rod 51 extending into the chamber 17 is of reduced diameter whereby an orifice 68 is thereby formed, the purpose of which will be explained hereinafter.

The central rod 51 with the valve surfaces mounted thereon is shifted in opposition to the compression spring 63 by means of a valve actuator assembly 71 which is mounted on the rightward end of the valve assembly as viewed in FIGURE 1. The valve actuator assembly 71 comprises a tubular housing portion 72 having an end plate 73 fixedly connected thereto by means of screws 74. The end plate 73 is provided with an external or pilot pressure port 76 passing therethrough for a purpose to be described hereinafter. The other end of the tubular housing portion 72 is slideably received over a reduced portion 77 of the valve housing 11. The edge of the tubular portion 71 abuts a shoulder 78 formed on the housing 11 and is fixedly connected thereto by means of screws 79.

The end plates 26 and 73, in conjunction with the tubular portion 72, cooperate to form a chamber 81 therebetween. The chamber 81 is similarly divided into compartments 82 and 83 by means of a flexible seal or diaphragm 86. The diaphragm 86, preferably of the rolling type, is formed with an enlargement 87 around the periphery thereof which is received within a peripheral recess 88 formed in the end member 73. The enlargement 87 functions in much the same manner as an O-ring so as to form an effective seal between the compartments 82 and 83 at the inner face between the end plate 73 and the tubular portion 72.

The central portion of the diaphragm 86 is provided with a small central opening therein whereby a plunger assembly 89 is fixedly connected thereto, movement of the diaphragm 86 thus causing similar movement of the plunger assembly 89. The plunger assembly 89 comprises a plunger member 91 having a central cylindrical portion 92, which portion has a reduced conical portion 93 formed on one end thereof and a reduced threaded portion 94 formed on the other end thereof. The plunger assembly is fixedly connected to the diaphragm by means of a cup member 97 which is slideably received over the threaded portion 94 so as to abut a shoulder 98 at the interface of the threaded portion 94 and the central cylindrical portion 92. The reduced threaded portion 94 of the plunger 91 is then passed through a small central opening formed within the diaphragm 86 whereby the face of the diaphragm confronting the compartment 83 bears against the cup member 97. A pressure plate 99 having a small central opening therein is then passed over the threaded section 94 so as to bear against the opposite face of the diaphragm 86. The complete assembly is then fixedly interconnected by means of a nut 101 which is threadedly received on the reduced threaded portion 94 so as to fixedly clamp the central portion of the diaphragm 86 between the cup member 97 and the pressure plate 99. The cup member 97 and the pressure plate 99 are preferably of rather large diameter so as to create a rather large clamping surface in engagement with the diaphragm 86 so as to form a seal between the compartments 82 and 83. Furthermore, the cup member 97, by being of rather large diameter, presents a sufficiently rigid assembly so as to prevent improper functioning of the diaphragm 86.

The plunger member 91 is slideably received within an opening 103 formed in an extension 102 integrally connected to the end member 26. The opening 103 is of a diameter whereby the central portion 92 of the plunger assembly is slideably but snugly received therein. When the central portion 92 is received within the extension 102, the opening 103 effectively forms a small chamber 104 at the inner end thereof, the chamber 104 surrounding the reduced conical portion 93 formed on the plunger member 91. The end plate 26 has a small opening or orifice 106 formed therein interconnecting the compartment 22 with the chamber 104. The chamber 104 is further interconnected to the compartment 83 by means of a transverse passageway 107 formed in the extension 102, and thence to a low-pressure system, such as the atmosphere, by means of a vent port 108 formed in the tubular housing portion 72.

As is clearly shown in FIGURE 1, the compartment 22 is interconnected with the pressure system only by means of orifices 68 and 106 respectively. However, for successful operation of the valve actuator assembly of the present invention, it is essential that the orifice 106 have a diameter equal to or greater than, and preferably greater than, the diameter of the orifice 68. On the other hand, the orifice 68 should not be so small as to prevent reasonably rapid operation of the device.

OPERATION

The operation of the valve will be readily understood by those skilled in the art but will be described hereinafter for the purpose of effecting a complete disclosure.

High-pressure fluid introduced into inlet port 12 travels through passageway 58 and apertures 33 within diaphragm 21 into compartment 31 of the end chamber 18. If the valve is in the position shown in FIGURE 1, the pressure of such fluid is imposed on the leftward side of the hub 41 and on the leftward end flange surface 52A of the rod 51. Because there is not an equal opposing force on the rightward side of the hub 41, the valve is firmly held in its rightward position as is shown in FIGURE 1 and thereby prevents the passage of such pressure fluid from the inlet port 12 to the load port 13.

If the valve rod 51 and the structure associated therewith should be in the leftward position so that the valve surface 42 bears against the valve seat 46, other pressure relationships are created which will become apparent as the description proceeds by which the valve is held in its leftward position. Thus, the high fluid pressure from the inlet 12 tends to hold the valve in whatever position it occupies at a given time, and the valve actuator assembly 71 is actuated only to change such position.

When the valve is in the position shown in FIGURE 1, the pressure fluid will enter the valve assembly by means of the inlet port 12 from where it will pass through the passageway 58 into the compartment 31. The pressure fluid will then pass through the opening 61 and the orifice 68 into the compartment 22. The fluid will leave the compartment 22 by means of the orifice 106 whereby the fluid will enter the chamber 104 and from there shall pass through the passageway 107 into the compartment 83. The fluid within the compartment 83 will then be transferred therefrom to a low pressure environment by means of the vent 108. Assuming that the vent or exhaust port 108 is open to the atmosphere, the fluid contained within the chambers 83 and 104 will similarly be at or very slightly above atmospheric pressure. Furthermore, since the orifice 68 is preferably substantially smaller than the orifice 106, the fluid contained within the compartment 22 will likewise be slightly above atmospheric pressure or, at a pressure level substantially less than the magnitude of the pressure of the fluid as it enters the compartment 31 and the opening 61. Since the fluid entering the inlet port 12 is generally at a high-pressure level, and since the orifice 68 is the smallest restriction within the conduit system, the pressure fluid will undergo a substantial pressure drop as it travels through the orifice 68, such a pressure drop being well known and understood to those skilled in the art. Since the pressure of the fluid contained within the compartment 22 is of a relatively low magnitude, which low pressure bears against the right-hand end of the rod 51, while the left-hand end of the rod is exposed to the high pressure contained within the compartment 31, the rod 51 will be maintained in its rightward position substantially as shown in FIGURE 1.

If the valve actuator assembly is now energized, a low pressure fluid from a source S will pass through the pilot pressure port 76 into the compartment 82 so as to bear against the diaphragm 86. Since the pressure contained within the compartment 82 will be greater than the pressure of the fluid within the compartment 83, the pressure of the fluid within the compartment 83 being at or very slightly above atmospheric, the plunger assembly 89 will be moved leftwardly as shown in FIGURE 1. Leftward movement of the plunger assembly due to the low-pressure fluid contained within the compartment 82 will cause the plunger member 91 to slide within the opening 103 until the reduced conical portion 93 comes into contact with the end of the orifice 106. Since the orifice 106 is of relatively small diameter and further since the pressure of the fluid passing therethrough is of a relatively low value, the plunger 91 will continue to move leftwardly until the point of the conical portion 93 comes into contact with and completely seals off the orifice 106. The nose of the conical portion 93 will then be maintained in tight sealing engagement with the orifice 106 due to the continuous pressure of the fluid contained within the compartment 82.

After the conical portion 93 has sealed or closed off the orifice 106, the pressure fluid passing through the orifice 68 will accumulate within the compartment 22 so as to cause the pressure to build up therein. The pressure within the compartment 22 will continue to increase until the effect of the pressure on the end of the flange 48 and the end of the hub 39 causes the rod 51 to shift axially to its leftward position opposite that shown in FIGURE 1. The rod 51 will be shifted to its leftwardmost position when the pressure in the compartment 22 reaches a value such that the sum of the leftwardly applied forces is greater than the sum of the rightwardly applied forces acting on the rod 51. When the rod 51 is shifted to its leftwardmost position, the valve surface 42 will come into contact with the valve seat 46 while simultaneously therewith, the valve surface 43 will leave contact with the valve seat 47 whereby the pressure fluid contained within the compartment 32 will then enter into the central passageway 16 and from there pass through the load port 13 to an external load device. The valve will remain in this condition as long as the compartment 82 is pressurized so as to maintain the conical portion 93 in sealing engagement with the orifice 106. Furthermore, this position is easily and efficiently maintained due to the fact that the force maintaining the conical plunger member in sealing engagement with the orifice 106 is much greater than the force tending to dislodge the same. The force tending to maintain the conical member 93 in sealing engagement with the orifice 106 is the product of the low pressure contained within the compartment 82 times the effective transverse bearing area of the plunger, which area is substantially the internal cross-sectional area of the tubular housing portion 71. On the other hand, the force tending to dislodge the conical portion 93 from sealing engagement with the orifice 106 consists merely of the product of the high pressure contained within the compartment 22 times the area of the orifice 106, which area is of a very small magnitude such that the result force produced thereby is likewise very small.

When the pressure of the fluid within the pilot or actuating system is vented to the atmosphere, the pressure of the fluid within the compartment 82 has similarly become atmospheric and thus the high pressure of the fluid within the compartment 22 acting through the orifice 106 on the nose of the conical portion 93 will cause the plunger assembly to be moved rightwardly to its normal position as illustrated in FIGURE 1 whereby the compartment 22 will again be in communication with the chambers 104 and 83. Further, a small spring could be positioned within compartment 83 so as to bias the plunger assembly 89 toward its normal position (rightwardly in FIGURE 1). The pressure within the compartment 22 will thus rapidly decrease until the pressure of the fluid within the compartment 22 is much less than the pressure of the fluid entering the inlet port 12. The decreasing pressure within the compartment 22 will then cause the rod member 51 to be shifted axially to its rightward position as illustrated in FIGURE 1 whereby the high-pressure fluid will again enter the valve assembly by means of the inlet port 12 and leave the valve assembly at a relatively low pressure by means of the vent 108.

As is readily apparent from the above description, the valve assembly of the present invention can be readily incorporated into a system utilizing high-fluid pressures, the valve assembly utilizing the high-pressure fluid of the system so as to accomplish shifting of the valve member from a first position wherein the high-pressure inlet is interconnected to a load port to a second position wherein the load port is interconnected to an exhaust port. Furthermore, the actual shifting is initiated by means of a pilot system or actuator which utilizes a low-pressure fluid for initiating the shifting action. The pilot system is furthermore of a relatively simple nature and very economical to manufacture and maintain since the pressure utilized in the pilot system is of a low magnitude, and is responsive to a small change in differential pressure so as to initiate the shifting action. Furthermore, due to the large magnitude of the effective pressure area of the compartment 82 when compared to the pressure area of the orifice 106, the effective pressure area of the compartment 82 being essentially the internal cross-sectional area of the tubular portion 72, it is readily apparent that a very small pressure differential between the pressure level of the fluid in the compartment 82 when compared to the pressure of the fluid in the compartment 83 will produce a substantially large force tending to move the plunger member 91 into sealing engagement with the orifice 106. Thus, the actuator assembly 89 can be designed so as to be very sensitive to small pressure differentials across the diaphragm 86.

The external pressure source S for the valve actuator assembly can be replaced with a closed compartment which is interconnected with the compartment 82 of the valve actuator assembly 71. The compartment is of a fixed volume and contains a gaseous fluid therein. Assuming the compartment to be of a high heat conductive material, any changes in the environmental temperature surrounding the compartment will likewise cause a similar change in the temperature of the gas contained within the compartment. As is well known, any substantial increase in the temperature of the fluid within the compartment will cause a corresponding increase in the pressure of the fluid contained within the compartment and will also cause the fluid within the compartment to tend to expand so as to increase the volume thereof. Due to this tendency of the fluid within the closed system to expand as the environmental temperature increases, the fluid will bear against the diaphragm 86 and will cause the same to move leftwardly so as to move the plunger 91 into sealing engagement with the orifice 106. Since the actuator assembly is very sensitive to very small differential pressures on opposite sides of the diaphragm 86, the plunger assembly 89 will move into and out of engagement with the orifice 106 so as to control the shifting action of the valve assembly merely by rather small changes in the environmental temperature surrounding the closed system consisting of the gas contained within the chamber and the compartment 82, which small temperature changes cause a corresponding change in the pressure and volume of the gas contained within the closed system. Thus, the valve of the present invention, when used in combination with a closed chamber for actuating the plunger mechanism, is of great utility in those situations where it is desired to shift a valve member in response to changes in the envirnonmental temperature surrounding the valve assembly.

Similarly, the closed chamber could hold the fluid at a constant pressure corresponding to normal barometric pressure. If the actual ambient barometric pressure around the valve should drop below normal barometric pressure so that the pressure in compartment 83 becomes less than the pressure in compartment 82, then the valve will be shifted. Thus, the operation of the valve can be made responsive to ambient temperature and pressure conditions as well as to a positive pilot pressure control.

MODIFICATIONS

Figure 3:
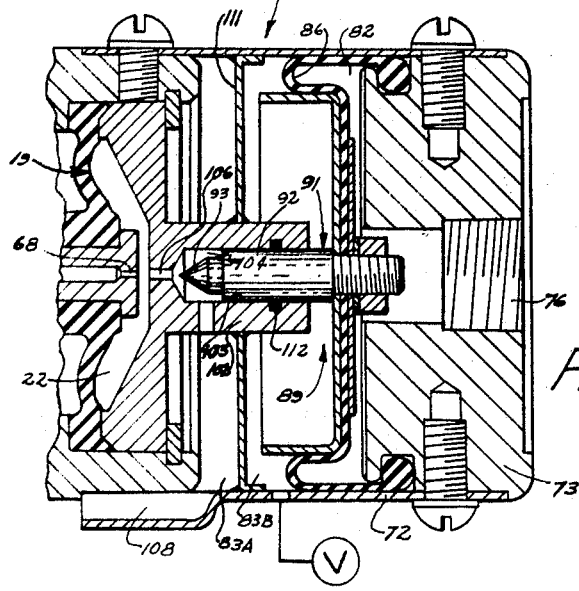
FIGURE 3 is a partial cross-sectional view showing a modification of the valve assembly.

A modification of the present invention is illustrated in FIGURE 3 wherein a rigid plate element 111 is located within the compartment 83 so as to divide the same into two separate compartments. The outer periphery of the plate element 111 is interconnected to the tubular housing portion 72 while the inner periphery of the plate element is connected to the external surface of the extension 102. The plate element 111 divides the compartment 83 into two subcompartments 83A and 83B which are respectively sealed from each other. Further, if desired, an O-ring seal 112 could be positioned between the central portion 92 of the plunger and the opening 103 so as to completely seal the subcompartments from one another. The subcompartment 83A is in communication with the atmosphere by means of the vent 108 while the other subcompartment 83B is connected to a source of vacuum V.

The valve actuator assembly can be made responsive to changes in the vacuum applied in chamber 83B merely by leaving the pilot port 76 open to the atmosphere such that the pressure of the fluid contained within the compartment 82 is atmospheric as is true of the pressure fluid contained within the subcompartment 83A. In this manner, the shifting of the valve rod 51 is controlled solely by changes in the vacuum in chamber 83B.

Figure 4:
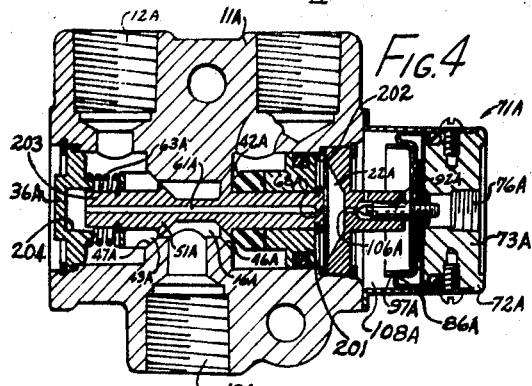
FIGURE 4 is a cross-sectional view showing a further modification of the valve assembly.

A further modification appears in FIGURE 4 wherein the head assembly 71 is used with a slightly different form of valve unit. In the valve unit of FIGURE 4, which is at least in some respects similar to the valve of U.S. Patent No. 3,042,072, the diaphragms utilized in the valve described above are omitted and the valves guided by other means. Corresponding parts of the valve of FIGURE 4 are identified by the same numerals as used in FIGURE 3 with the suffix A added. In addition, instead of the diaphragms of FIGURES 1–3, there is provided piston 201 operating in bore 202 (for the same purpose as diaphragm 19 in FIGURE 1) and guide 203 acting in recess 204 (for the same purpose as diaphragm 21 in FIGURE 1). The operation of the valve of FIGURE 4 is the same as already described for FIGURES 1–3.

As readily appears from the above description, the present invention represents a distinct improvement over the prior art by providing a valve assembly which can be incorporated into and used with a high-pressure system, the valve being shifted by means of an actuator which utilizes a low-pressure fluid to initiate the shifting action in such a manner that the actual high-pressure fluid being controlled is actually utilized to accomplish the shifting action. Furthermore, since the actuator is able to initiate the shifting action by means of a low-pressure fluid, the system is readily adaptable for use in controlling the valve in response to changes in the pressure and environmental temperature of the system surrounding the valve.

Although particular preferred embodiments of the invention have been disclosed hereinabove for purposes of illustration, it will be understood that variations or modifications thereof which lie within the scope of the invention as defined by the appended claims are fully contemplated.

The embodiments of the invention in which an exclusive property or privilege is claimed are defined as follows:

1. A valve structure including a low pressure pilot actuator, comprising in combination:

housing means having first and second chamber means formed therein with said second chamber means being divided into first and second subchambers;

fluid communication means interconnecting said first and second chamber means for permitting flow from said first chamber means to said second chamber means, said fluid communication means including a third chamber and a first passageway connecting said first chamber means to said third chamber means and a second passageway connecting said third chamber means to said first subchamber;

fluid actuator means including movable blocking means for selectively controlling flow of fluid from said first chamber means through said flow communication means to said first subchamber;

said blocking means including movable piston means in sealing engagement with the walls of said second chamber means with said piston means dividing said second chamber means into said first and second subchambers, said blocking means further including a reciprocable plunger member connected to and having a portion projecting outwardly from said movable piston means, said plunger member having a blocking portion formed on the free end of said projecting portion, and said projecting portion having a cross-sectional area transverse to the direction of movement of said blocking means substantially less than the transverse cross-sectional area of said piston means;

said housing means having a bore formed therein with said bore being open at one end and substantially closed at the other end, the projecting portion of said plunger member being snugly and slideably received within said bore and extending outwardly through the open end thereof for connection to said piston means, the free end of the extending portion of said plunger member being spaced from the other end of said bore for defining said third chamber therebetween, said third chamber having a transverse cross-sectional area approximately equal to the transverse cross-sectional area of the extending portion of said plunger member, and said first and second passageways communicating with said third chamber substantially adjacent said other end of said bore;

said housing means having a vent port and a pilot port formed therein in communication with said first and second subchambers, respectively, said pilot port being adapted to be connected to a supply of low pressure pilot fluid for supplying same to said second subchamber for moving the blocking portion of said plunger member from a retracted open position into an advanced closed position for blocking said first passageway to prevent flow from said first chamber means to said first subchamber;

said housing means further having an inlet port and a load port formed therein said inlet port being adapted to be connected to a supply of pressurized working fluid and said load port being adapted to be connected to an external load;

first passage means connected between said inlet port and said first chamber means for supplying pressurized working fluid thereto, said first passage means including a small orifice therein whereby a substantial pressure drop occurs as the pressurized fluid passes therethrough;

second passage means interconnecting said inlet port to said load port;

valve means movably mounted within said housing means for selectively controlling the flow of pressurized working fluid from said inlet port to said load port, said valve means including a valve member movable between a first position preventing flow through said second passage means from said inlet port to said load port and a second position for permitting flow through said second passage means;

whereby supplying low pressure pilot fluid to said second subchamber causes movement of said plunger member so that the blocking portion thereof moves from said open to said closed position for blocking said first passageway so as to cause a pressure build-up to occur within said first chamber means, which pressure build-up acts against said valve member and causes same to move from said first position to said second position for permitting flow through said second passage means, relieving the pilot pressure within the second subchamber permitting the plunger member to return to its open position due to the pressurized working fluid within said first chamber means acting through said first passageway for imposing a return force on the blocking portion of said plunger member with the fluid flowing into said third chamber to assist in returning said plunger member to its open position, the fluid then flowing from the third chamber through said second passageway into said first subchamber whereby the fluid then flows through said vent port.

2. A valve structure according to claim 1, wherein said piston means includes a resilient diaphragm having the outer peripheral edge thereof secured to the walls defining said second chamber means for dividing same into said first and second subchambers; and said plunger member being fixedly secured to the central portion of said resilient diaphragm and projecting axially therefrom into said first subchamber, and the blocking portion formed on the free end of said plunger member having a smaller transverse cross-sectional area than said bore.

3. A valve construction according to claim 2, wherein the blocking portion of said plunger member comprises a needle valve adapted to sealingly engage and close said first passageway when said plunger member is moved to said closed position.

4. A valve construction according to claim 2, wherein said housing means includes a fourth chamber means formed therein in communication with said inlet port;

said valve member including an elongated central portion extending between said first and fourth chamber means and having opposite end portions fixedly secured to said central portion and movably positioned within said first and fourth chamber means, respectively; and means acting on said valve member for normally biasing same toward said first position for preventing flow of pressurized working fluid through said second passage means from said inlet port to said load port.

5. A valve construction according to claim 4, wherein said housing means includes a hub portion projecting therefrom into said first subchamber in substantial axial alignment with the central portion of said valve member, said hub portion having said bore formed therein and extending axially thereof;

the projecting portion of said plunger member being of cylindrical configuration and being in snug and sliding engagement with the walls defining said bore; and said piston means having an effective pressure area transverse to the axial direction substantially greater than the pressure area formed on said plunger member transverse to said axial direction.

6. A pilot actuated valve, comprising in combination:

housing means having first and second chamber means formed therein, a first passage formed in said housing means in communication with and extending between said first and second chamber means, said first passage having a cross-sectional area smaller than the cross-sectional area of said first and second chamber means;

first port means formed in said housing means in communication with said first chamber means;

second port means formed in said housing means in communication with said first passageway;

valve means movably mounted within said housing means for controlling the flow of pressurized fluid between said first and second port means, said valve means including an elongated rod-like valve member movably positioned within said housing means and having a first end portion fixedly secured thereto and movably positioned within said first chamber means, said valve member further having a second end portion fixedly secured thereto and movably positioned within said second chamber means;

said housing means having first and second valve seats formed thereon within said first and second chamber means, respectively, in surrounding relationship to the opposite ends of said first passageway;

first resilient seal means coacting between the first end portion of said valve member and said first valve seat for preventing flow between said first chamber means and said first passageway when said valve means is in a first position;

second resilient seal means coacting between said second end portion of said valve member and said second valve seat for preventing flow of fluid between said first passageway and said second chamber means when said valve member is in a second position, said valve member being mounted within said housing means for reciprocable movement between said first and second positions;

said valve means further including third resilient seal means coacting between said second end portion of said valve member and the walls of said second chamber means for dividing same into first and second closed compartments, said first closed compartment being in communication with said first passageway;

a second passageway extending between one of said port means and said second closed compartment for continuously supplying pressurized fluid thereto, said second passageway including therein an orifice for causing a substantial pressure drop as the pressurized fluid passes therethrough;

said housing means further having a third port means and a third passageway interconnecting said third port means with said second closed compartment;

fluid actuator means including a plunger member movably mounted within a third chamber means formed within said housing means for blocking said third passageway and preventing fluid flow therethrough, application of pressurized fluid to said plunger member causing same to move from a first position to a second position in blocking relationship with said third passageway;

said housing means further including fourth port means adapted to be connected to a pilot pressure source for supplying pressurized fluid to said plunger member for moving same from said first to said second positions; and said third chamber means including a plate dividing same into first and second subcompartments, said first subcompartment forming a part of said third passageway and interconnecting said second passageway and said third port means, said third port means, being in communication with the atmosphere, said second subcompartment being connected to a source of vacuum and acting on said plunger member so as to actuate the same whereby said third passageway is blocked and said valve member is actuated in response to application of vacuum to said second subcompartment.

References Cited

UNITED STATES PATENTS

| | | | |
|---|---|---|---|
| 1,569,336 | 1/1926 | Roesch | 137—79 |
| 2,544,520 | 3/1951 | Ball | 137—81 |
| 2,674,266 | 4/1954 | Gardner | 137—625.66 |
| 2,722,234 | 11/1955 | Macgeorge et al. | 137—625.6 |
| 2,756,774 | 7/1956 | Markson | 137—625.6 |
| 2,761,470 | 9/1956 | Batts | 137—625.6 |
| 2,912,009 | 11/1959 | Cooksley | 137—625.65 |
| 2,913,005 | 11/1959 | Grant et al. | 137—625.6 |
| 2,963,034 | 12/1960 | Cummins | 137—81 |
| 3,208,720 | 9/1965 | Huntington | 137—625.66 XR |
| 3,326,239 | 6/1967 | Saint-Jaanis et al. | 137—625.66 |

HENRY T. KLINKSIEK, Primary Examiner

ROBERT J. MILLER, Assistant Examiner